United States Patent
Elshishiny et al.

(10) Patent No.: US 10,042,998 B2
(45) Date of Patent: Aug. 7, 2018

(54) AUTOMATICALLY ALTERING AND ENCRYPTING PASSWORDS IN SYSTEMS

(71) Applicant: International Business Machines Corporation, Armonk, NY (US)

(72) Inventors: Hisham E. Elshishiny, Cairo (EG); Mohamed S. Salem, Cairo (EG); Shady S. M. Samaan, Cairo (EG); Amr F. Yassin, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 14/730,719

(22) Filed: Jun. 4, 2015

(65) Prior Publication Data
US 2017/0132409 A1    May 11, 2017

(51) Int. Cl.
| | |
|---|---|
| *G06F 21/46* | (2013.01) |
| *G06F 21/62* | (2013.01) |
| *H04L 9/08* | (2006.01) |
| *G06F 21/31* | (2013.01) |
| *H04L 29/06* | (2006.01) |
| *G06F 17/27* | (2006.01) |

(52) U.S. Cl.
CPC .......... *G06F 21/46* (2013.01); *G06F 21/6245* (2013.01); *H04L 9/0894* (2013.01); *G06F 17/2735* (2013.01); *G06F 21/31* (2013.01); *H04L 63/083* (2013.01); *H04L 63/0815* (2013.01); *H04L 63/0846* (2013.01)

(58) Field of Classification Search
None
See application file for complete search history.

(56) References Cited

U.S. PATENT DOCUMENTS

| | | | | |
|---|---|---|---|---|
| 7,281,018 B1 * | 10/2007 | Begun | .................... | G06F 17/218 |
| 7,779,345 B2 * | 8/2010 | Topalov | ................ | G06F 15/167 |
| | | | | 715/224 |
| 8,417,715 B1 * | 4/2013 | Bruckhaus | ........ | G06F 17/30994 |
| | | | | 705/26.1 |
| 8,539,562 B2 | 9/2013 | Bolik et al. | | |
| 8,640,209 B2 | 1/2014 | Ohkado | | |
| 8,875,261 B2 | 10/2014 | Delia et al. | | |

(Continued)

FOREIGN PATENT DOCUMENTS

CN        103259689 A      8/2013

OTHER PUBLICATIONS

List of IBM Patents or Patent Applications Treated as Related; Dated Sep. 9, 2016; 2 pages.

(Continued)

*Primary Examiner* — Saleh Najjar
*Assistant Examiner* — Michael W Chao
(74) *Attorney, Agent, or Firm* — Edward J. Wixted, III (57) ABSTRACT

In an approach for changing a password. Aspects of an embodiment of the present invention include an approach for changing a password, wherein the approach includes a processor identifies a resource protected by a password. A processor discovers at least one information source containing information relevant to a process for changing the password of the resource. A processor constructs a set of procedures to change the password using the information relevant to the process for changing the password. A processor alters the password of the resource according to the constructed set of procedures.

17 Claims, 3 Drawing Sheets

(56) References Cited

U.S. PATENT DOCUMENTS

| | | | | |
|---|---|---|---|---|
| 9,436,669 | B1* | 9/2016 | Sorensen | G06F 17/243 |
| 9,842,102 | B2* | 12/2017 | Salome | G06F 17/2735 |
| 9,864,851 | B2* | 1/2018 | Adams | G06F 21/31 |
| 9,887,991 | B2* | 2/2018 | Allinson | H04L 63/0853 |
| 2003/0005299 | A1 | 1/2003 | Xia et al. | |
| 2004/0064742 | A1 | 4/2004 | Excoffier et al. | |
| 2004/0068693 | A1* | 4/2004 | Rawat | G06F 17/243 715/226 |
| 2005/0076239 | A1 | 4/2005 | Locke et al. | |
| 2005/0114673 | A1 | 5/2005 | Raikar et al. | |
| 2006/0259960 | A1 | 11/2006 | Kondo | |
| 2007/0226783 | A1* | 9/2007 | Mimlitsch | H04L 63/0815 726/4 |
| 2007/0283317 | A1 | 12/2007 | Sadler et al. | |
| 2008/0066020 | A1* | 3/2008 | Boss | G06F 17/243 715/780 |
| 2008/0091663 | A1* | 4/2008 | Inala | G06F 9/4443 |
| 2008/0307235 | A1* | 12/2008 | Keohane | G06F 21/46 713/183 |
| 2010/0215270 | A1 | 8/2010 | Manohar | G06F 21/36 382/177 |
| 2011/0287739 | A1* | 11/2011 | Cajigas Bringas | H04L 63/18 455/410 |
| 2011/0301996 | A1* | 12/2011 | Johnson | G06Q 10/06 705/7.26 |
| 2012/0042237 | A1* | 2/2012 | Armandpour | G06F 11/3672 715/234 |
| 2013/0014236 | A1* | 1/2013 | Bingell | G06F 21/45 726/6 |
| 2015/0067468 | A1 | 3/2015 | Emanuel et al. | |
| 2015/0207819 | A1 | 7/2015 | Sartor | |
| 2015/0254452 | A1* | 9/2015 | Kohlenberg | H04L 63/083 726/6 |
| 2017/0187697 | A1* | 6/2017 | Li | H04L 63/06 |
| 2017/0357713 | A1* | 12/2017 | Yuen | G06F 3/04842 |
| 2018/0019984 | A1* | 1/2018 | Isaacson | H04L 63/06 |

OTHER PUBLICATIONS

U.S. Appl. No. 15/260,470, filed Sep. 9, 2016; Entitled "Automatically Altering and Encrypting Passwords in Systems".

List of IBM Patents or Patent Applications Treated as Related, Dated Apr. 1, 2016, 2 pages.

U.S. Appl. No. 15/088,456, filed Apr. 1, 2016, Entitled "Automatically Altering and Encrypting Passwords in Systems".

Rubenking, Neil J.; "The Best Password Managers for 2015"; © 1996-2015 Ziff Davis, LLC. PCMag Digital Group; Printed Mar. 25, 2015; pp. 1-5; <http://www.pcmag.com/article2/0,2817,2407168,00.asp>.

"Enterprise Password Vault"; CYBERARK; © Cyber-Ark Software Ltd.; pp. 1-2 <http://www.cyberark.com/products/priviledged-account-security-solution/enterprise-password-vault/>.

"IBM Knowledge Center"; IBM; Printed Mar. 25, 2015; p. 1; <http://www-01.ibm.com/support/knowledgecenter/>.

"Random Password Manager"; LIEBERMANSOFTWARE; Downloaded Jan. 23, 2015; <http://www.liebsoft.com/Random_Password_Manager/>.

"Lieberman Software Unveils Privileged Password Management Platform to Increase Security and Uptime of Enterprise Environments"; LIEBERMANSOFTWARE; Downloaded Jan. 26, 2015; pp. 1-2; <http://www.liebsoft.com/www_liebsoft_com/4_0/Pages/Press_Releases/Lieberman_Software_Unveils_Privileged_Password_Management Platform_to_Increase_Security_and_Uptime_of Enterprise_Environments>.

"Password Management Services"; Motorola, Inc.; © Motorola, Inc. 2010; p. 1; <www.motorola.com/services/government>.

Elshishiny et al., "Automatically Altering and Encrypting Passwords in Systems" U.S. Appl. No. 15/717,983, filed Sep. 28, 2017, 22 pages.

IBM, "List of IBM Patents or Patent Applications Treated as Related", Appendix P, Filed Sep. 28, 2017, 2 pages.

\* cited by examiner

AUTOMATICALLY ALTERING AND ENCRYPTING PASSWORDS IN SYSTEMS

BACKGROUND

The present invention relates generally to the field of data encryption, and more particularly to automatically discovering, changing, and encrypting passwords for systems.

A vast majority of computer programs and products are password encrypted to protect user data, user information, and the functionality of products. A password is a word or string of characters used for user authentication to prove identity or access approval to gain access to a resource and should be kept secret from those not allowed access.

With many products or programs a user's password is required to be altered or updated after, for example, predetermined time periods have expired to maintain a high level of security as the user's password might have been compromised. Some systems have a simple process for updating the password, while other systems may have complex and/or detailed procedures to update a password. The password alteration frequency can be relatively high. For example, some banks have a policy to alter production system passwords every 3-6 months as a regular practice. The passwords may need to be encrypted as well when using different encryption mechanisms to avoid tampering with them.

Complex systems are those systems which are composed of multiple middleware systems, such as application servers, databases, business process management systems and portals. Different passwords might need to be altered in one or more databases, property files, administration consoles, archive files or additional mechanisms. For example changing the database access user password is required in some systems which are using the database in a specific order. Some system have their own mechanism for storing such database passwords. The steps required to alter the passwords, if performed manually are prone to errors. These errors may cause some systems to malfunction or increase system down time.

SUMMARY

Embodiments of the present invention disclose a method, a computer program product, and a computer system for changing a password. Aspects of an embodiment of the present invention include an approach for changing a password, wherein the approach includes a processor identifies a resource protected by a password. A processor discovers at least one information source containing information relevant to a process for changing the password of the resource. A processor constructs a set of procedures to change the password using the information relevant to the process for changing the password. A processor alters the password of the resource according to the constructed set of procedures.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention disclose a method, computer program product, and computer system, to provide an approach to automatically discover, modify, and encrypt a password for a systems.

The present invention will now be described in detail with reference to the Figures.

Figure 1:
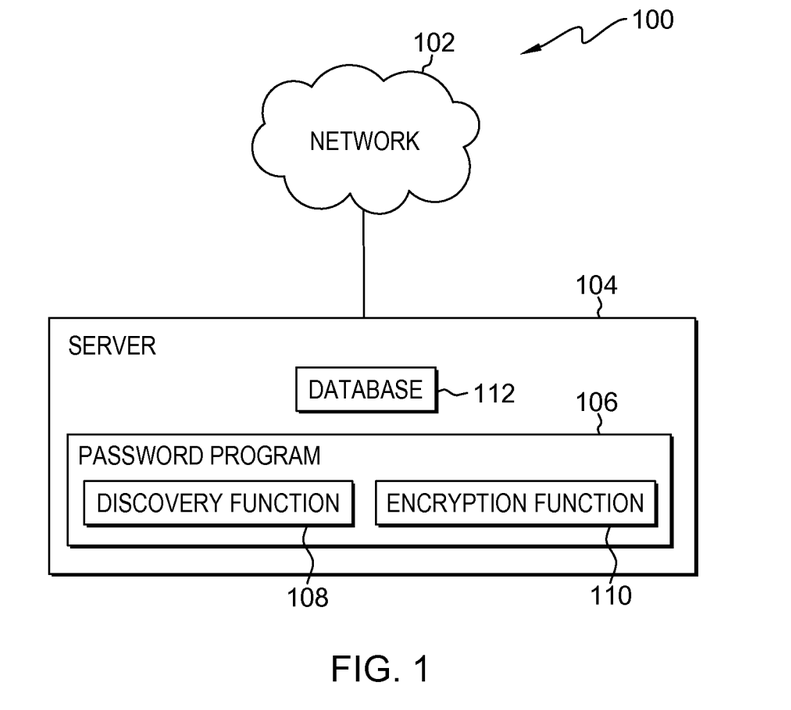
FIG. 1 depicts a block diagram depicting a computing environment, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to, network 102 and server 104. Computing environment 100 may include additional computing devices, servers, computers, components, or additional devices not shown.

Network 102 may be a local area network (LAN), a wide area network (WAN) such as the Internet, any combination thereof, or any combination of connections and protocols that support communications between server 104 and other computing devices (not shown) in accordance with some embodiments of the invention. Network 102 may include wired, wireless, or fiber optic connections.

Server 104 may be a management server, a web server, an electronic device or computing system capable of processing program instructions and receiving and sending data.

In some embodiments, server 104 may be a laptop computer, tablet computer, netbook computer, personal computer (PC), desktop computer, or any programmable electronic device capable of communicating with additional devices via network 102. In additional embodiments, server 104 may represent a server computing system utilizing multiple computers as a server system, such as in a cloud computing environment. In another embodiment, server 104 represents a computing system utilizing clustered computers and nodes to act as a single pool of seamless resources. In the depicted embodiment, server 104 includes password program 106 and database 112. In additional embodiments, server 104 may further include additional programs, storage devices, or components (not shown). Server 104 may include components, as depicted and described in further detail with respect to FIG. 4.

Password program 106 controls the discovery, alteration, and encryption of the password of one or more products (not shown). Each product, can be, for example a computer program that contains a user encryption function, a standalone encryption program, or other programs that require a user to use a password. In one embodiment, password program 106 control the discovery, alteration, and encryption of a plurality of passwords for a plurality of products. In the depicted embodiment, password program 106 is located on server 104. In additional embodiments, password program 106 may be located on other servers provided password program 106 has access to database 112. In the depicted embodiment, password program 106 includes discovery function 108 and encryption function 110. In another embodiments, discovery function 108 and encryption function 110 may be functions of other programs, or standalone programs located on server 104, other servers, or other computing devices, provided that discovery function 108 and encryption function 110 are each accessible to password program 106.

In one embodiment, password program 106 uses natural language processing and at least one set of dictionaries and rules to perform text analytics on individual resources which password program 106 locates to determine if each individual resource contains information related to changing or modifying passwords. Text analytics can be performed using an Unstructured Information Management Architecture (UIMA) application configured to analyze unstructured information to discover knowledge that is relevant to password program 106, by processing plain text and identifying entities, such as the procedures to change the password or information related to changing a password for the program which password program computing device 106 is searching for.

Discovery function 108 discovers the password alteration process for the product upon which the password is being altered, and generates a procedure to alter the password for the product. Discovery function 108 analyzes product information to gather the process for altering the password in the product. The information may be, for example, product provided information, information from a third party, or additional information related to the process of changing the password within the product. Discovery function 108 uses the discovered process to generate a procedure to alter the password. In one embodiment, discovery function 108 uses a standardized process notation in the generated procedures. In another embodiment, discovery function 108 edits the generated procedures once the procedures have been created. In another embodiment, discovery function 108 stores the procedures once they are created in database 112, or another repository for data, which is accessible by password program 106 and/or encryption function 110. In the depicted embodiment, discovery function 108 is a function of password program 106. In another embodiments, discovery function 108 may stand alone as a program located on server 104, or an additional computing device, provided that discovery function 108 is accessible to password program 106.

Encryption function 110 alters the password of the product within the specifications of the user. Encryption function 110 uses the information and procedures gathered and created by discovery function 108 to alter the password of the product. In one embodiment, encryption function 110 automatically alters the password of the product. In another embodiment, encryption function 110 alters the password of the product based on a set of predetermined instructions. In another embodiment, encryption function 110 stores the old and new passwords in database 112, or another repository for data, which is accessible by password program 106 and/or discovery function 108. In another embodiment, encryption function 110 reviews the procedure created by discovery function 108, and if encryption function 110 locates an error in the procedure, informs either password program 106 or discovery function 108 of the error. In another embodiment, encryption function 110 stores the password for the product in database 112, or another repository for data, which is accessible by password program 106, and/or discovery function 108. In the depicted embodiment, encryption function 110 is located within password program 106. In another embodiments, encryption function 110 may stand alone as a program located on server 104, or any additional computing device, provided encryption function 110 is accessible to password program 106.

Database 112 may be a repository which may be written to and/or read by password program 106. In one embodiment, database 112 includes, for example, packaging utility files, encryption utilities, product resources, configuration files, property files, source codes, passwords, product procedures, and additional information related to the discovery, and encryption of passwords. In additional embodiments, database 108 may be written to and/or read by password program 106, discovery function 108, encryption function 110 and/or additional computing devices, servers, computers, components, or additional devices not shown. In one embodiment, database 112 is a database management system (DBMS), used to allow the definition, creation, querying, update, and administration of a database(s). In another embodiment, database 112 is a relationship database management system (RDMS). In the depicted embodiment, database 112 is stored on server 104. In additional embodiments, database 112 may reside on an alternative server, computer, or computing device, provided database 112 is able to communicate with password program 106, discovery function 108, encryption function 110 and/or additional computing devices, servers, computers, components, or additional devices not shown.

Figure 2:
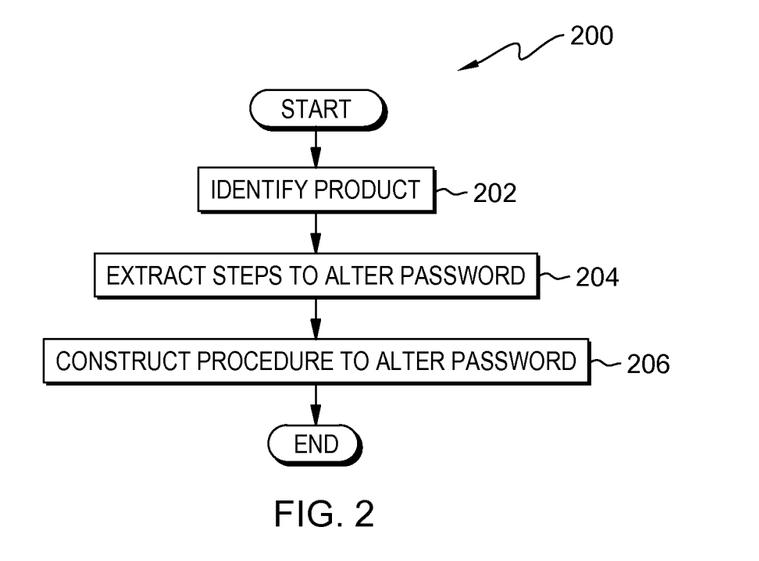
FIG. 2 depicts a flowchart of the operational steps taken by discovery function to discover the password creation process within computing environment 100 of FIG. 1, in accordance with an embodiment of the present invention.

FIG. 2 depicts a flowchart of the operational steps taken by discovery function 108 to discover how the password is created and modified within computing environment 100 of FIG. 1, in accordance with an embodiment of the present invention. Flowchart 200 depicts the operational steps taken by discovery function 108 to discover the password process of the product.

In step 202, discovery function 108 identifies the product. Discovery function 108 identifies a product which is used by the user, and requires a password or other form of encryption data for the user to access to the product. In other embodiments, discovery function 108 identifies a product which is selected by a third party for discovery function 108. Discovery function 108 analyzes the product to determine the product is the proper product. In one embodiment, discovery function 108 identifies the user and the user's password associated with the product. In one embodiment, discovery function 108 stores this identified information about the product, user, and/or password in a repository. In another embodiment, discovery function 108 identifies the product, user, and/or password when a set of predetermined instructions are completed.

In step 204, discovery function 108 extracts the steps to alter a password of the product. Discovery function 108 analyzes the product to locate information regarding the procedure of creating, and modifying the password, and additional aspects of the product which would assist in the alteration of the password of the product. In one embodiment, discovery function 108 analyzes the product with the use of text analytics. In another embodiment, discovery function 108 analyzes the product by parsing through data related to the product to determine the instructions to create, or modify the password. Discovery function 108 analyzes information, which may be, for example, encyclopedia articles, information centers, online articles, training materials, blogs, product tutorials, product training manuals, and additional sources of information regarding the product, and/or the process of altering the password in the product. In some embodiments, the extracted steps may be, for example, lists, tutorials, videos, pictures, or additional file types which may be read by discovery function 108 and include the necessary steps to alter the password of the product. In one embodiment, discovery function 108 extracts the steps and stores the steps in database 112. In one embodiment, discovery function 108 stores the information relevant to modifying the password in a repository. In one embodiment, discovery function 108 analyzes the user supplied password for the product. In one embodiment, a third party supplies discovery function 108 with the user's password. A third party, can be for example, the user's superior, or another person that has access to the user's password. In another embodiment, discovery function 108 analyzes the user's new password. In some embodiments, discovery function 108 after analyzing the user's old and new password, stores this information in a repository. In one embodiment, discovery function 108 automatically analyzes the product.

In step 206, discovery function 108 constructs the procedures to alter the password for the product. Discovery function 108 constructs the procedure which encryption function 110 uses to alter the password of each respective product (see FIG. 3). In one embodiment, discovery function 108 constructs the procedures to alter the password by creating script which encryption function 110 is capable of processing. In another embodiment, discovery function 108 constructs the procedures to alter the password Discovery function 108 uses the information gathered by discovery function 108 to create a procedure or procedures which encryption function 110 is compatible with to alter the password of the product. In one embodiment, discovery function 108 stores the procedure in database 112. In some embodiments, discovery function 108 does not construct the procedure, but replicates the procedure of the product which is already in place, and relays this information to encryption function 110. In additional embodiments, discovery function 108 creates a procedure which is compatible with a plurality of programs. In additional embodiments, discovery function 108 constructs a plurality of procedures for a product due to multi-level password protection of the product and the databases, or connected products which product is required to communicate with to operate correctly. In one embodiment, discovery function 108 automatically creates the procedure. In additional embodiments, discovery function 108 creates the procedure after a set of predetermined instructions are completed. In yet another embodiment, discovery function 108 requires approval of the procedure before continuing to the next step.

In one embodiment, discovery function 108 reviews the generated procedure. Discovery function 108 reviews the generated procedure to, for example, confirm the procedure works correctly, is compatible with the product, performs within the predetermined time period, is compatible with encryption function 110, or additional aspects of the procedure which require a review. In one embodiment, discovery function 108 performs the review automatically. In another embodiment, discovery function 108 generates a report of the success/failure of the reviews. In yet another embodiment, discovery function 108 generates a report based on a set of predetermined requirements which the review is based on. The predetermined requirements, can be, for example, the speed at which encryption function 110 can perform the procedure, the probability of success of the procedure, or amount of human interaction the procedure may require. If the review fails to meet or exceed the set of predetermined requirements, discovery function 108 may, for example, alert a third party, restart the process, and review the procedure a plurality of times more. In some embodiments, even a procedure which fails to meet the set of predetermined requirements, discovery function 108 stores the procedure in database 112.

Figure 3:
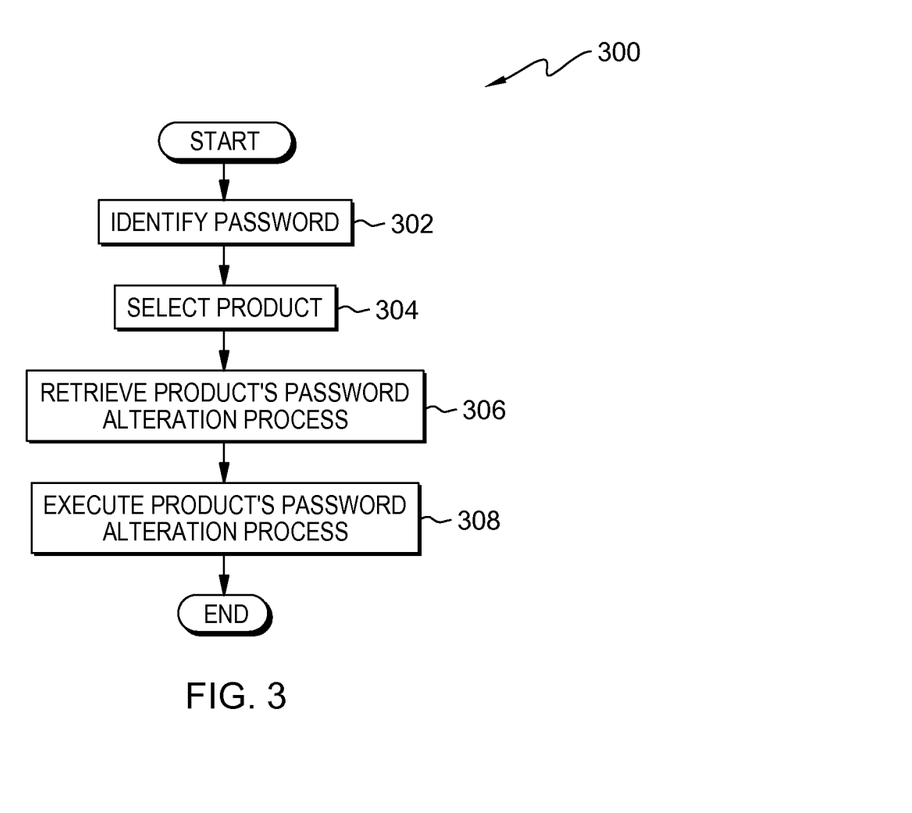
FIG. 3 depicts a flowchart of the operational step taken by an encryption function to update the password of the product within computing environment 100 of FIG. 1, in accordance with an embodiment of the present invention.

FIG. 3 depicts a flowchart of the operational step taken by encryption function to update the password of the product within computing environment 100 of FIG. 1, in accordance with an embodiment of the present invention. Flowchart 300 depicts the updating of the product password.

In step 302, encryption function 110 identifies a password. Encryption function 110 identifies the password of a user for the product which is going to be altered. This password is supplied by, for example, the user, and a third party. In another embodiment, password program 106 requests the user's password be supplied to encryption function 110 from the user. The password may be, for example, the user's old password, the user's generated new password, a randomly generated new password for the user, a list of passwords created by the user, a password created by a third party, or additional passwords which are to replace the old password of the user. In some embodiments, the password is based on a set of predetermined characteristics which are required to be met before the password is eligible for use. Some of the characteristics may be, for example, an amount of characters, use of capitals, use of symbols, or a requirement that the password be different from a previous password. In some embodiments, encryption function 110 stores the passwords and the information related to the passwords in database 112. In some embodiments, encryption function 110's identification of the password for the product is executed automatically.

In step 304, encryption function 110 selects the product. Encryption function 110 selects the product which is going to be impacted by the alteration of the password. In some embodiments, there may be a plurality of products with a plurality of users, who have a plurality of passwords which are all to be altered. Encryption function 110 may be instructed to alter only a specific or a set of specific users, or products, or passwords within the larger grouping. In some embodiments, encryption function 110 may have a time table instructing when a specific product, user, or password, of a plurality of products, users, and passwords needs to be altered. In some embodiments, encryption function 110 performs the identification of the impacted product automatically. In one embodiment, encryption function 110 encrypts the identified impacted product in database 112 to protect the information.

In step 306, encryption function 110 retrieve the product's password alteration process. Encryption function 110 gathers the product's password alteration process from discovery function 108 or password program 106. This process can also include the expiration date of the password. In some embodiments, encryption function 110 gathers the product's password alteration process from database 112. In some embodiments, encryption function 110 performs the identification of the product's password alteration process automatically. In some embodiments, encryption function 110 identifies the product's password alteration process through the use of, for example, java, web application server (WAS), or additional encryption utilities which are capable of identifying a product's password alteration process. The utilities may be stored on server 104, but may also be stored on external locations within network 102 provided encryption function 110 may access the utilities. In one embodiment, encryption function 110 encrypts the identified password alteration process in database 112 to protect the information.

In step 308, encryption function 110 executes the products process. Encryption function 110 executes the product's process of updating the password, or inputting a new password. In some embodiments, encryption function 110 performs the execution automatically. In additional embodiments, encryption function 110 performs the execution once a set of predetermined requirements are completed. The new password may be, for example, the user's personally generated new password, an arbitrarily generated new password for the user, a list of passwords created by the user, a password created by a third party. In some embodiments, the password is created based on a predefined set of rules. This predefined set of rules specify how the password is to be altered. This alteration can be in the form of, for example, length, capital letters, numbers, symbols, and other characteristics of a password. In some embodiments, encryption function 110 has a predefined date or time which the password is changed on. This date can be, for example, the date which the password is set to expire based on the product's expiration dates, a user defined date, or a date set by password program 106.

Figure 4:
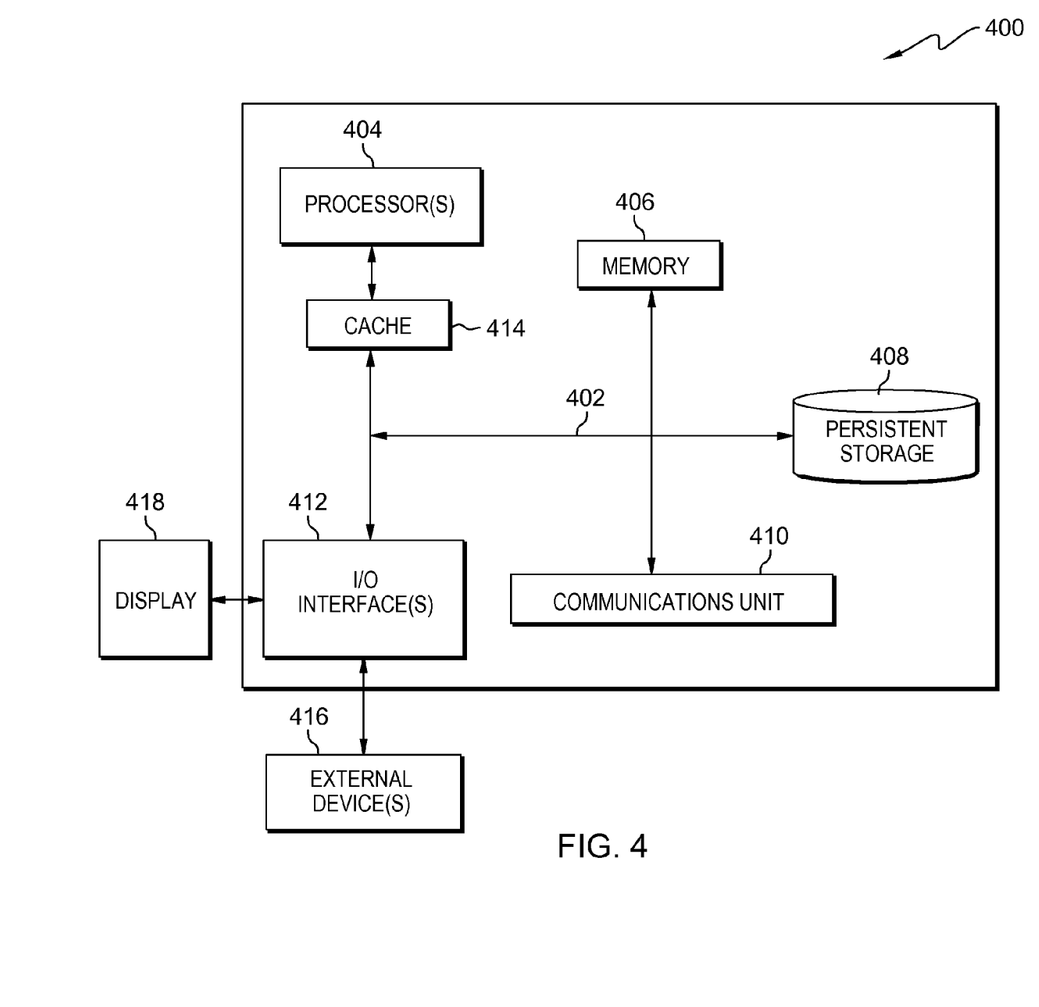
FIG. 4 depicts a block diagram depicting the internal and external components of the server of FIG. 1, in accordance with one embodiment of the present invention.

FIG. 4 depicts a block diagram 400 of components of server 104, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 104 includes communications fabric 402, which provides communications between computer processor(s) 404, memory 406, persistent storage 408, communications unit 410, and input/output (I/O) interface(s) 412. Communications fabric 402 may be implemented with any architecture designed for passing data and/or control information between processors (such as microprocessors, communications and network processors, etc.), system memory, peripheral devices, and any additional hardware components within a system. For example, communications fabric 402 may be implemented with one or more buses.

Memory 406 and persistent storage 408 are computer-readable storage media. In one embodiment, memory 406 includes random access memory (RAM) and cache memory 414. In general, memory 406 may include any suitable volatile or non-volatile computer-readable storage media.

Memory 406 is stored for execution by one or more of the respective computer processors 404 of server 104 via one or more memories of memory 406 of server 104. In the depicted embodiment, persistent storage 408 includes a magnetic hard disk drive. Alternatively, or in addition to a magnetic hard disk drive, persistent storage 408 may include a solid state hard drive, a semiconductor storage device, read-only memory (ROM), erasable programmable read-only memory (EPROM), flash memory, or any additional computer-readable storage media which is capable of storing program instructions or digital information.

The media used by persistent storage 408 may also be removable. For example, a removable hard drive may be used for persistent storage 408. Additional examples include optical and magnetic disks, thumb drives, and smart cards which are inserted into a drive for transfer onto another computer-readable storage medium which is also part of persistent storage 408.

Communications unit 410, in the examples, provides for communications with additional data processing systems or devices, including server 104. In the examples, communications unit 410 includes one or more network interface cards. Communications unit 410 may provide communications through the use of either or both physical and wireless communications links.

I/O interface(s) 412 allows for input and output of data with additional devices which may be connected to server 104. For example, I/O interface 412 may provide a connection to external devices 416 such as a keyboard, keypad, camera, a touch screen, and/or some additional suitable input device. External devices 416 may also include portable computer-readable storage media such as, for example, thumb drives, portable optical or magnetic disks, and memory cards. Software and data used to practice embodiments of the present invention, e.g., function of password program 106 may be stored on such portable computer-readable storage media and may be loaded onto persistent storage 408 of server 104 via I/O interface(s) 412 of server 104. Software and data used to practice embodiments of the present invention, e.g., password program 106 may be stored on such portable computer-readable storage media and may be loaded onto persistent storage 408 of server 104 via I/O interface(s) 412 of server 104. I/O interface(s) 412 also connect to a display 418.

Display 418 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device which may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method for changing a password, the method comprising:
    identifying, by one or more processors, a resource protected by a password;
    discovering, by one or more processors, at least one information source containing information relevant to a process for changing the password of the resource by using natural language processing and at least one set of dictionaries and rules to perform text analytics on the at least one information source;
    constructing, by one or more processors, a set of procedures to change the password using the information relevant to the process for changing the password;
    altering, by one or more processors, the password of the resource according to a constructed set of procedures;
    generating, by one or more processors, a first report of a success rate of a review of the constructed set of procedures; and
    generating, by one or more processors, a second report based on a set of predetermined requirements for which the review of the constructed set of procedures is based, wherein the set of predetermined requirements include a speed at which the constructed set of procedures are performed, a probability of success of the constructed set of procedures, and an amount of human interaction required to perform the constructed set of procedures.

2. The method of claim 1, further comprising:
    receiving an indication of a date upon which the password of the resource is set to expire; and
    wherein the step of altering the password of the resource according to the constructed set of procedures occurs on or before the date upon which the password of the resource is set to expire.

3. The method of claim 1, wherein constructing the set of procedures comprises:
    analyzing, by one or more processors, the at least one information source;
    extracting, by one or more processors, the information relevant to the process for changing the password from the at least one information source; and
    constructing, by one or more processors, the set of procedures to change the password using the information relevant to the process for changing the password.

4. The method of claim 1, further comprising:
subsequent to storing the set of procedures to change the password of the resource, receiving, by one or more processors, a request to modify the password of the resource;
retrieving, by one or more processors, a stored set of procedures to change the password of the resource; and
altering, by one or more processors, the password of the resource according to the stored set of procedures.

5. The method of claim 1, wherein the at least one information source is unstructured information; and
wherein the step of discovering the at least one information source containing information relevant to the process for changing the password of the resource includes performing text analytics on the text of the at least one information source.

6. The method of claim 1, wherein the text analytics are performed using an Unstructured Information Management Architecture application configured to analyze unstructured information to discover relevant information by processing plain text and identifying entities, including the set of procedures to change the password and information related to changing the password.

7. A computer program product for changing a password, the computer program product comprising:
one or more computer readable storage media and program instructions stored on the one or more computer readable storage media, the program instructions comprising:
program instructions to identify a resource protected by a password;
program instructions to discover at least one information source containing information relevant to a process for changing the password of the resource by using natural language processing and at least one set of dictionaries and rules to perform text analytics on the at least one information source;
program instructions to construct a set of procedures to change the password using the information relevant to the process for changing the password;
program instructions to alter the password of the resource according to a constructed set of procedures;
program instructions to generate a first report of a success rate of a review of the constructed set of procedures; and
program instructions to generate a second report based on a set of predetermined requirements for which the review of the constructed set of procedures is based, wherein the set of predetermined requirements include a speed at which the constructed set of procedures are performed, a probability of success of the constructed set of procedures, and an amount of human interaction required to perform the constructed set of procedures.

8. The computer program product of claim 7, further comprising:
program instructions, stored on the one or more computer readable storage media, to receive an indication of a date upon which the password of the resource is set to expire; and
wherein the program instructions to alter the password of the resource according to the constructed set of procedures occur on or before the date upon which the password of the resource is set to expire.

9. The computer program product of claim 7, wherein program instructions to construct the set of procedures comprise:
program instructions to analyze the at least one information source;
program instructions to extract the information relevant to the process for changing the password from the at least one information source; and
program instructions to construct the set of procedures to change the password using the information relevant to the process for changing the password.

10. The computer program product of claim 7, further comprising:
program instructions, stored on the one or more computer readable storage media to, subsequent to storing the set of procedures to change the password of the resource, receive a request to modify the password of the resource;
program instructions to retrieve a stored set of procedures to change the password of the resource; and
program instructions to alter the password of the resource according to the stored set of procedures.

11. The computer program product of claim 7, wherein the at least one information source is unstructured information; and
wherein the program instructions to discover the at least one information source containing information relevant to the process for changing the password of the resource include program instructions to perform text analytics on the text of the at least one information source.

12. A computer system for changing a password, the computer system comprising:
one or more hardware processors, one or more computer readable storage media, and program instructions stored on the one or more computer readable storage media for execution by at least one of the one or more processors, the program instructions comprising:
program instructions to identify a resource protected by a password;
program instructions to discover at least one information source containing information relevant to a process for changing the password of the resource by using natural language processing and at least one set of dictionaries and rules to perform text analytics on the at least one information source;
program instructions to construct a set of procedures to change the password using the information relevant to the process for changing the password;
program instructions to alter the password of the resource according to a constructed set of procedures;
program instructions to generate a first report of a success rate of a review of the constructed set of procedures; and
program instructions to generate a second report based on a set of predetermined requirements for which the review of the constructed set of procedures is based, wherein the set of predetermined requirements include a speed at which the constructed set of procedures are performed, a probability of success of the constructed set of procedures, and an amount of human interaction required to perform the constructed set of procedures.

13. The computer system of claim 12, further comprising:
program instructions, stored on the computer readable storage media for execution by at least one of the one or more processors, to receive an indication of a date upon which the password of the resource is set to expire; and
wherein the program instructions to alter the password of the resource according to the constructed set of procedures occur on or before the date upon which the password of the resource is set to expire.

14. The computer system of claim 12, wherein program instructions to construct the set of procedures comprise:
- program instructions to analyze the at least one information source;
- program instructions to extract the information relevant to the process for changing the password from the at least one information source; and
- program instructions to construct the set of procedures to change the password using the information relevant to the process for changing the password.

15. The computer system of claim 12, further comprising:
- program instructions, stored on the computer readable storage media for execution by at least one of the one or more processors, to store the set of procedures to change the password of the resource.

16. The computer system of claim 15, further comprising:
- program instructions, stored on the computer readable storage media for execution by at least one of the one or more processors, to, subsequent to storing the set of procedures to change the password of the resource, receive a request to modify the password of the resource;
- program instructions, stored on the computer readable storage media for execution by at least one of the one or more processors, to retrieve a stored set of procedures to change the password of the resource; and
- program instructions, stored on the computer readable storage media for execution by at least one of the one or more processors, to alter the password of the resource according to the stored set of procedures.

17. The computer system of claim 12, wherein the at least one information source is unstructured information; and
- wherein program instructions to discover the at least one information source containing information relevant to the process for changing the password of the resource includes program instructions to perform text analytics on the text of the at least one information source.

\* \* \* \* \*